United States Patent [19]

Hindersinn

[11] 4,419,400

[45] Dec. 6, 1983

[54] PULTRUDED REINFORCED PHENOLIC RESIN PRODUCTS

[75] Inventor: Raymond R. Hindersinn, Lewiston, N.Y.

[73] Assignee: Occidental Chemical Corporation, Niagara Falls, N.Y.

[21] Appl. No.: 315,097

[22] Filed: Oct. 26, 1981

[51] Int. Cl.³ .......................... B29G 2/00; B29G 7/00; B32B 5/16; B32B 27/42
[52] U.S. Cl. .................................. 428/245; 156/180; 264/137; 428/288; 428/290; 428/294; 428/408; 428/436; 428/477.7; 428/902; 524/762
[58] Field of Search .................... 264/137; 156/180; 428/245, 288, 290, 294, 408, 436, 477.7, 902

[56] References Cited

U.S. PATENT DOCUMENTS

| | | | |
|---|---|---|---|
| 3,658,751 | 4/1972 | Gragen | 523/157 |
| 4,168,194 | 9/1979 | Stiles | 264/137 |
| 4,244,765 | 1/1981 | Tokuno | 264/137 |
| 4,305,770 | 12/1981 | Stiles | 264/137 |

*Primary Examiner*—James C. Cannon
*Attorney, Agent, or Firm*—James F. Tao; James F. Mudd

[57] ABSTRACT

Filament reinforced phenolic resin products are provided which comprise a plurality of filaments and a cured, normally liquid phenolic resin interspersed around the filaments. The filaments can be in the form of continuous fibers, roving, woven roving, cloth and mat. The products are useful in structural applications. Also disclosed are novel glycol-modified resole phenolic resins and oligomeric polyol-modified resole phenolic resins.

11 Claims, No Drawings

PULTRUDED REINFORCED PHENOLIC RESIN PRODUCTS

BACKGROUND OF THE INVENTION

There is a continuing need for plastic products having higher performance characteristics to meet the demands for plastic products in commercial and industrial applications, particularly in structural applications.

Particularly useful are extruded plastic articles or profiles having a variety of cross-sectional shapes, such as flat, angular or tubular cross-sections, and which are reinforced with filaments such as glass strands, roving and mat. Such plastic tubes, rods and sheets can range in size and configuration from small strips or angular pieces up to large cylindrical or angular tubular structures.

Such plastic products have heretofore been made from polyester resins and epoxy resins by a pultrusion process such as disclosed in U.S. Pat. No. 3,244,784. Such processes have not heretofore been successfully applied to the production of articles from phenolic resins.

It is an object of this invention to provide filament reinforced plastic products made from phenolic resins.

It is a further object of this invention to provide improved phenolic resins suitable for use in continuous pultrusion processes for manufacturing filament-reinforced plastic products.

SUMMARY OF THE INVENTION

This invention relates to filament reinforced plastic products that comprise a plurality of filaments such as in the form of individual filaments, roving or mats, and a cured or partially cured, normally liquid phenolic resin interspersed around the filaments. Where individual fibers or roving are employed, it is preferred that a substantial proportion of the filaments have their longitudinal axis aligned with the direction of flow of the profile or product.

As a preferred aspect of the invention, the liquid phenolic resins used to make the filament reinforced products of the invention have a viscosity in the range of about 900 to about 3,000 centipoises at 23° C. and a maximum volatile content of about 12 weight percent of volatile material having a boiling point of less than 120° C. Such liquid phenolic resins are preferably resole resins and more preferably glycol-modified resole resins. Another preferred liquid phenolic resin is an oligomer, i.e. polyol, modified resole resin.

The invention also relates to novel liquid phenolic resins, such as resole resins, glycol-modified resole resins and oligomeric polyol modified resole phenolic resins which have a viscosity in the range of about 500 to about 4,000 centipoises at 23° C. and a maximum volatile content of about 12 weight percent of volatile material having a boiling point of less than 120° C. The preferred viscosity of the above-described phenolic resins is in the range of about 800 to about 3,000 centipoise at 23° C.

DESCRIPTION OF THE PREFERRED EMBODIMENTS

The Phenolic Resins

The phenolic resins useful in the practice of the invention are characterized in the art as resole resins. Phenolic resole resins are generally prepared by reacting a phenol with an excess molar proportion of an aldehyde in the presence of an alkaline catalyst.

Examples of phenols which can be used in preparing a phenol aldehyde resole for use in practicing the invention include ortho-, para-directing hydroxy or amino aromatic compounds having 6 to 24 carbon atoms such as phenol itself ($C_6H_5OH$), naphthol, anthranol and substituted derivatives thereof where the substituents on the aromatic compound are independently selected from hydrogen; halogen such as Cl, Br, and F; $NH_2$ and hydrogen radicals such as:

a. alkyl groups or radicals of 1 to 60 carbon atoms, preferably of 1 to 30 carbon atoms, and their various isomeric forms;

b. cycloalkyl groups of 5 to 12 carbon atoms such as cyclohexyl, cyclopentyl, methylcyclohexyl, butylcyclohexyl, and so forth;

c. aryl ketonic groups wherein the hydrocarbon portion is as defined below in (e);

d. alkyl, aryl and cycloalkyl carboxylic groups wherein the hydrocarbon part is defined as above in (a) and (b);

e. aryl groups of 6 to 24 carbon atoms such as phenyl, naphthyl, anthryl, and the like;

f. aryl substituted alkyl wherein the aryl is phenyl which may contain lower alkyl and/or hydroxy substituents so that the resulting hydroxy aromatic is, for example, a bisphenol;

g. the oxyhydrocarbon radicals corresponding to the foregoing hydrocarbon radicals; and h. mixtures of the aforesaid hydroxy aromatics.

Suitable substituted phenols include meta-cresol, m-propyl phenol, m-isobutyl phenol, m-sec-butyl phenol, m-tert-butyl phenol, m-bromo phenol, m-chloro phenol, m-phenyl phenol, m-benzylphenol, m-cetyl phenol, m-cumyl phenol, m-hydroxyacetophenone, m-hydroxybenzophenone, m-d-limonene phenol. The corresponding phenols substituted in the ortho- and para-positions can be used in part but are not preferred.

Mixtures of various hydroxy aromatic compounds mentioned herein also may be used.

Included among the phenolic reactants which may be used are those known as the "cresylic acids" and these often comprise heterogeneous mixtures having two reacting hydrogen positions on each of them; that is, compounds unsubstituted in the ortho- and para-positions of the molecule, to compounds that only have one functional position, and hence, relatively unreactive. These compounds may include the following: 3,5-xylenol, m-cresol, 3,4-xylenol, 2,5-xylenol, 2,3-xylenol, phenol, p-cresol, o-cresol, 2,4-xylenol, and 2,6-xylenol. Cresylic acids or tar acids may include phenol and its homologs which may include cresols, xylenols, trimethyl phenols, ethyl phenols, and higher boiling materials such as dihydroxy phenols, polycyclic phenols and the like. They are often obtained by a low-temperature trimerization of coal, lignite, and the like, or a conventional high-temperature coke oven tar, or the liquid product of petroleum cracking both thermo and catalytic, shell oil, coal hydrogenation products, and the like.

Polyhydroxy aromatic reactants, such as resorcinol, may also be used.

Also useful in this invention are mixtures of aniline and phenol to react with an aldehyde or ketone to produce either a novolak or a resole, depending on the other conditions described above.

Also useful in the invention are mixtures of urea and phenol to react with the aldehyde or ketone to produce a resole.

Among the aldehydes which may be used within the scope of this invention to produce resoles are formaldehyde or any of its variations, such as 37 percent or higher concentrations of formalin, or paraldehyde, acetaldehyde, propionaldehyde, isobutyraldehyde, isopentaldehyde, and the like. The aldehyde should have not more than 8 carbon atoms and should not detrimentally affect the resinification of the resin. Preferred aldehydes are those having from 1 to 4 carbon atoms, such as formaldehyde, which may be in aqueous solution (37 percent or higher), or in any of its low polymeric forms such as paraformaldehyde or trioxane. Other aldehydes include para-aldehydes, furfural, 2-ethylhexanal, ethylbutyraldehyde, heptaldehyde benzaldehyde and crotonaldehyde.

The liquid one-stage resin (resole) which forms a part of this invention may be formed by reacting a hydroxy aromatic compound with at least one and up to three moles of aldehyde per mole of hydroxy mono-aromatic compound in alkali such as sodium hydroxide dissolved in water. The ratio of aldehyde to phenol is preferably in the range of about 1.5:1 to 2.5:1. The reaction mixture is gradually heated to reflux and held at reflux until less than about 1 percent of free formaldehyde remains. This provides a preferred reaction product which has less than 2 percent of the formaldehyde unreacted, although this is not critical in this process. Less than 2 percent free $CH_2O$ is desirable. The reaction mixture is then cooled and the catalyst neutralized with some acid such as glacial acetic or sulfuric acids, and the pH is adjusted to roughly 5 to 6. The resin is then dehydrated to about 80 to 99 percent solids, and preferably about 88 to 95 percent solids.

The alkaline catalyst used in preparing the resoles to be used in this invention may be any of those known in the art; for instance, sodium hydroxide and calcium hydroxide. In general, the alkali metal hydroxides and the alkaline earth metal hydroxides and ammonium hydroxide and the amines such as triethanol amines may be used.

Following the intercondensation reaction to form a resole, a stoichiometric quantity of a strong acid such as sulfuric acid, hydrochloric acid, phosphoric acid or oxalic acid, or the like, is added to the reaction mixture in order to neutralize the alkaline condensation catalyst. Sulfuric acid is conveniently employed to neutralize a sodium hydroxide catalyst. The alkaline catalyst may also be neutralized by dilution through repeated washing, however, it is preferred to use an acid. The final resin should have a pH of about 5 to 6 for good stability.

A preferred type of liquid phenolic resin for use in the invention are the glycol-modified resole resins such as disclosed in British Pat. No. 1,363,227, the disclosure of which is incorporated herein by reference. This patent discloses resins prepared from a phenol-aldehyde condensation product, a glycol and an acid catalyst. The phenol-aldehyde condensation product is prepared using a basic catalyst and has a ratio of aldehyde to phenol of about 1.1 to 2.5:1. The glycol is present in the final product in an amount of about 12 to 35% by weight based on weight of the phenolaldehyde condensation product. The phenol and aldehyde can be any of those disclosed hereinabove, while the glycol is typically an alkylene glycol.

As specific examples there may be mentioned ethylene glycol, diethylene glycol, triethylene glycol, monopropylene glycol, dipropylene glycol, tripropylene glycol, butylene glycol, polyethylene glycols, polypropylene glycols, glycol derivatives such as monoglyceryl cresyl ether and substituted polypropylene glycols. A particularly preferred glycol is di-propylene glycol.

Most preferred for use in the practice of the invention are certain novel liquid phenolic resins that have both a low viscosity and a low volatile content. The low viscosity aids in processing the liquid phenolic resin and filament strands through the extrusion step in the production of filament-reinforced products in the invention. The low volatile content of the liquid phenolic resins enables the avoidance of boiling liquid during the curing of the liquid phenolic resins. The preferred liquid phenolic resins have a viscosity in the range of about 500 to about 4,000 centipoises at 23° C. and a maximum volatile content of about 12 weight percent of volatile material having a boiling point of less than 120° C. Preferably, the viscosity of the resins is in the rage of about 800 to about 3,000 centipoises at 23° C.

The preferred liquid phenolic resins having low viscosity and low volatility are glycol-modified phenolic resole resins prepared by first reacting the phenol and aldehyde components using conditions described hereinabove, followed by addition of a glycol to the reaction product of the phenol and aldehyde. Generally, about 10 to about 30 weight percent of glycol is employed based on the weight of the phenol-aldehyde resin, preferably about 20 to 25 weight percent of the glycol is employed. Suitable glycols include those disclosed hereinabove.

An especially preferred product of the invention is an oligomeric polyol-modified phenolic resole resin having a viscosity in the range of about 500 to about 4,000 centipoise at 23° C. and a maximum volatile content of about 12 weight percent of volatile material having a boiling point of less than 120° C., preferably about 800 to about 3,000 centipoises at 23° C. Such novel resins are prepared by first reacting a phenol and an aldehyde to produce a resole resin and, thereafter, admixing an oligomeric polyol with the phenolaldehyde condensation product. Suitable phenols and aldehydes and reaction conditions for producing the phenol-aldehyde condensates are disclosed hereinabove.

The oligomeric polyol modifier for the phenolic resole resins should be neutral, compatible with the phenolic resin at a significant concentration, and be a pourable liquid at 30° C. Examples of such materials are polyalkylene ether glycols and polyols, polyester glycols and polyols, and hydroxyl-terminated polybutadienes. Illustrative of such materials are oxyalkylated sucrose, oxyalkylated pentarythritol, oxyalkylated sorbitol and oxyalkylated methyl glucoside. Suitable commercial oligomeric materials are disclosed in *Plastic Foams*, edited by K. Frisch and J. H. Saunders, published by Marcel Dekker, Inc., 1973, at page 460 of Volumn 2, Chapter entitiled "Rigid Urethane Foams", by J. K. Backus and P. G. Gemeinhardt, the disclosure of which is incorporated herein by reference.

The filament Component

Various filamentary materials may be used in producing the products of the invention such as glass, graphite and polymers, such as aromatic polyamides, for example, Kevlar filaments. The preferred filament component is glass fiber in the many forms available commercially.

The above-described filamentary materials can be employed in various physical forms. The filaments of the invention include fibers in any of a number of forms. Thus, filaments or fibers can be used in "continuous" or chopped form. Continuous filaments can be used as roving, which is defined as one or more "ends" or groups of filaments arranged in essentially parallel disposition. Such parallel orientation provides longitudinal strength in molded plastic articles. Woven roving may be employed where strength is also desired in a transverse direction in molded plastic articles. Continuous filaments can be used in the form of thread for strength in the longitudinal direction and in the form of cloth where strength is required in both longitudinal and transverse directions. Chopped filaments can be used in the form of mats to give strength in the longitudinal and transverse directions.

The Pultrusion Process

The filament reinforced products of the invention are produced by passing a filament component, preferably in a continuous form such as a filament, roving or thread, into a bath or vessel of the liquid resin component in which the filament component is saturated with the resin component. Next, the resin saturated filament component is passed through one or more suitable orifices having a smaller dimension than the composite of the resin saturated filament component. The orifice functions to squeeze out the excess liquid resin to maintain the ratio of the resin to filament constant in the process and to compress the resin-filament composite to the proper dimensions. Thereafter, the resin-filament composite may optionally be passed through a preheater so that the composite is cured more rapidly in subsequent steps of the process. The resulting preheated resin-filament composite is passed through an extrusion die which functions to heat and finally cure the resin component. The cured resin filament composite is pulled as a continuous strand from the pultrusion die with the aid of a suitable puller mechanism, commonly a pair of automatic pulling devices. The cured product can be cut into suitable length in a suitable cutting device. The process and apparatus for producing the products of the invention are disclosed in U.S. Pat. No. 3,244,784, the disclosure of which is incorporated herein be reference.

The Resin Bath

The filament component, in suitable form such as individual fibers, roving or mat, is saturated with the resin component at atmospheric temperature, although higher and lower temperatures can be used. The resin component is generally introduced to the bath in normally liquid form with or without the aid of a diluent. Reactive diluents can be used if necessary to achieve the desired viscosity and volatility to properly saturate the filament component. In the bath, sufficient resin component becomes saturated on the filament component to provide a ratio of about 30 to about 50 weight percent of resin component based on the weight of resin-filament component.

The Squeeze-down Die or Orifice

In the resin bath more resin component is permitted to saturate the filament component than is desired in the final product to insure there is always sufficient resin component present. Then the desired ratio of resin to filament components is achieved by squeezing out the excess resin as it passes through a suitable orifice or die member. One or more orifices or dies can be used in series to accomplish this step. The proportion of resin in the resin-filament composite leaving the last orifice or die is about 10 to about 30 weight percent resin on the resin-filament composite.

The Preheater

The resin-composite may be preheated if desired in any suitable heater, such as a dielectric heater, so it cures more rapidly in subsequent steps. The temperature in the preheater can range anywhere from about 30° to 100° C.

The Forming and Curing

The pultrusion of the resin-filament composite is accomplished in a forming and heating device such as described in U.S. Pat. No. 3,244,784, the disclosure of which is incorporated herein by reference. The function of the forming die, also known in this art as a pultrusion die, is to simultaneously form, heat and cure the resin component. If desired, the resin can be partially cured in situations where it is desired to hold the final cure to a subsequent step. Suitable heating and curing temperatures for the liquid phenolic resin of the invention are in the range of 105° to 250° C., preferably, 130° to 205° C.

The Puller

The filament component passes in a continuous manner from the preceeding described steps. This motion is sustained by a pulling device which functions to continuously pull on the cured resin-filament composite as it proceeds from the exit end of the curing die. Suitable pulling mechanisms are described in U.S. Pat. No. 3,244,784. Generally, the filament component is pulled from the die at a rate of about 1 to 20 feet per minute.

The Cutting Step

The cured or partially cured resin-filament composite emanating from the puller mechanism can be fed to a suitable cutting device which cuts the resin-filament composite into desired lengths.

The Filament-Reinforced Product

The products resulting from the process just described may be in the form of cured or partially cured shaped articles in the form of sheets, rods, hollow tubes. Thus, the articles of the invention can have a variety of cross-sectional shapes, such as flat, angular or tubular cross-section, and may range in size from small strips or angular pieces to large cylindrical or angular tubular structures.

Heretofor, phenolic resins have been processed by compression and injection molding processes. As a result of this invention, the use of phenolic resins has been extended to the field of pultruded plastics.

When compared to the extruded thermoplastics of the prior art, the reinforced products of the invention have higher heat resistance, greater hardness, stiffer modulus and improved creep resistance.

The products of the invention can be further reinforced by known processes such as filament winding such as disclosed in U.S. Pat. No. 3,579,402, the disclosure of which is incorporated herein by reference.

EXAMPLES

The following examples are meant to illustrate the invention, but not to limit it. Unless noted otherwise in this specification and claims, all temperatures are given in degrees Celsius and parts are by weight.

EXAMPLE 1—Preparation of Glycol Modified Phenolic Resole Resin

To a 50-gallon resin kettle equipped with an agitator, baffle, reflux column and a receiver was charged 93.35 lbs. of phenol, 116.65 lbs. of 50% aqueous formaldehyde, 3.01 lbs. of sodium hydroxide, and 116.6 lbs. of water. The reaction mixture was then heated with stirring to 60° C. during a 30 minute period, maintained at 60°–65° C. for 30 minutes, then at 80°–83° C. for a three hour period. A vacuum was then applied and 60 lbs. of water removed by distillation at a temperature of 50°–58° C. over an eight hour period. The reaction was then cooled to room temperature and allowed to stand overnight. A solution of 0.83 lbs. of concentrated sulfuric acid in 100 g. of water and 35.5 lbs. of dipropylene glycol was then added with stirring. The yield was 173 pounds of the resin having the following properties:

| | |
|---|---|
| pH | 5.6 |
| viscosity at 23° C. | 3,000 cps |
| water | 8.1% |
| formaldehyde | 2.2% |
| phenol | 3.6% |

Thus, the content of volatile material having a boiling point less than 120° C. was 10.3%.

EXAMPLE 2—Preparation of Oligomeric Polyol-Modified Phenolic Resole Resin

A phenolic resole was prepared by charging 2823.0 g (30.03 mole) of phenol, 4869.6 g aqueous formaldehyde (37% by wt.) (60.0 moles) and 22.8 g (0.57 moles) of sodium hydroxide dissolved in 100 cc of water, to a 12 liter, three-necked flask equipped with a mechanical stirrer, a thermometer and a reflux condenser. The system was then evacuated with a vacuum pump three times and filled with nitrogen. The mixture was stirred for a time then allowed to stand at room temperature overnight.

The flask was then equipped with a take-off condenser and a receiver, and the water slowly under reduced pressure at a temperature of 45°–72° C. over a period 3½ hours. The distillation pressure was slowly reduced from 300 mm to a final pressure of 38 mm, while a total of 3120.9 g. of distillate was removed. The resin at this point was then acidified with 19.5 grams of concentration $H_2SO_4$ dissolved in 100 cc of dipropylene glycol to a pH of 5.4 as measured directly on the resin with the pH meter probe. The yield of resin was 4827 g. of resin having a water content of 7.8 percent and a phenol content of 5.2 percent. This prouct was divided into portions. One such portion was mixed with 20 weight percent of a commercial oligomeric polyol designated Dow Polyglycol 15-200 and having a molecular weight of 2600. A second such portion was mixed with 40 weight percent of the aforesaid oligomeric polyol. The resulting oligomeric polyol modified resole phenolic resins are useful in producing products of the invention in accordance with Example 3.

EXAMPLE 3—Pultrusion Process

A resin formulation containing 86.2% of the resin of Example 1, 12% by weight of ASP-508 clay, 1% by weight of polyethylene wax lubricant, 0.8% of aminosilane coupling agent (UCC A-1102) and 2 pph of 70% aqueous p-toluenesulfonic acid was prepared with vigorous stirring with a power mixer until homogeneous, then added to the wetting bath of a laboratory size pultrusion unit.

The pultrusion unit was equipped with a 30-inch long, electrically heated curing die ½-inch wide and ⅛-inch thick, two squeeze-down dies and a variable speed puller. The glass fiber reinforcement consisted of 85 ends of type 30 Owens Corning Fiberglass 431CA glass roving. The curing die contained thermocouples 3.5 inches, 9 inches, 15 inches, 20.5 inches, and 25 inches from the die entrance and three individually controlled electrical strip heaters both top and bottom of the die.

After trying the dry roving to the puller and the die temperatures set at the following profile: 110° F.; 230° F.; 400° F.; and 420° F. successively from the entrance, the puller set at a rate of 12 inch/minute. The product emerged from the exit die in the form of a coupon, after a sufficient period of operation, and was found to be hard and dry. The physical properties of the product are listed in Table 1 and compared to typical properties of similar product prepared using an unsaturated polyester binder.

TABLE 1

Comparison of Some Physical Properties of Pultruded Products

| Property | Phenolic | Typical Polyester Properties* |
|---|---|---|
| Barcol Hardness | 25–30 | — |
| Flexural Strength $10^3$ psi | 71.6 ± 4.8% | 100–150 |
| Flexural Modulus $10^6$ psi | 4.95 ± 9.6% | 5–6 |
| Heat Distortion °C. | >300 | 190–220 |
| Glass Content % | 67 ± 2 | 40–80 |

*Data from J. B. Martin, Plastics Engineering, 53, March 1979.

As indicated in Table 1, although the phenolic product exhibited flexural strength and modulus values comparable to the polyester product, the heat distortion properties were much higher emphasizing the superior thermal resistance of the phenolic.

The procedure of Example 3 can be used to prepare products of the invention having various shapes depending on the configuration of the apparatus, particularly the shape of the curing die. Also, various forms of filament can be used in the process of Example 3 such as thread, cloth, woven roving and mat and combinations thereof depending on the properties and other characteristics of the final products.

I claim:

1. In a pultruded, filament-reinforced product having a substantially uniform cross-section throughout its length and comprising (a) a filament component comprising a plurality of filaments and (b) a cured normally liquid resin interspersed around said filaments; the improvement wherein the liquid resin is a liquid phenolic resin having a viscosity in the range of about 500 to about 4,000 centipoises at 23° C., and a maximum volatile content of about 12 weight percent of volatile material having a boiling point of less than 120° C.

2. The product of claim 1 wherein the filaments are continuous and the filaments are aligned with the longitudinal axis of the product.

3. The product of claim 2 wherein the filaments are in the form of roving.

4. The product of claim 2 wherein the filaments are in the form of thread.

5. The product of claim 1 wherein the product is in the form of a sheet and the filament component is in the form of woven roving.

6. The product of claim 1 wherein the product is in the form of a sheet and the filament component is in the form of cloth.

7. The product of claim 1 wherein the product is in the form of a sheet and the filament component is in the form of mat.

8. The product of claim 1 wherein the viscosity is in the range of about 800 to 3,000 centipoises at 23° C.

9. The product of claim 9 wherein the liquid phenolic resin is a resole resin.

10. The product of claim 10 wherein the liquid phenolic resin is a glycol-modified resole resin.

11. The product of claim 1 wherein the liquid phenolic resin is an oligomeric polyol-modified resole resin.

* * * * *